(12) United States Patent
Fehringer et al.

(10) Patent No.: US 9,853,569 B2
(45) Date of Patent: Dec. 26, 2017

(54) METHOD FOR ACTUATING INVERTERS CONNECTED IN PARALLEL

(71) Applicant: SCHNEIDER ELECTRIC POWER DRIVES GMBH, Vienna (AT)

(72) Inventors: Rudolf Fehringer, Vienna (AT); Gerhard Lehner, Asparn an der Zaya (AT)

(73) Assignee: SCHNEIDER ELECTRIC POWER DRIVES GMBH, Vienna (AT)

(*) Notice: Subject to any disclaimer, the term of this patent is extended or adjusted under 35 U.S.C. 154(b) by 0 days.

(21) Appl. No.: 15/105,786

(22) PCT Filed: Dec. 18, 2014

(86) PCT No.: PCT/AT2014/050305
§ 371 (c)(1),
(2) Date: Jun. 30, 2016

(87) PCT Pub. No.: WO2015/089537
PCT Pub. Date: Jun. 25, 2015

(65) Prior Publication Data
US 2016/0308463 A1    Oct. 20, 2016

(30) Foreign Application Priority Data
Dec. 19, 2013 (AT) .................. 973/2013

(51) Int. Cl.
*H02M 7/537* (2006.01)
*H02M 7/493* (2007.01)
*H02M 1/00* (2006.01)

(52) U.S. Cl.
CPC .......... *H02M 7/537* (2013.01); *H02M 7/493* (2013.01); *H02M 2001/0012* (2013.01)

(58) Field of Classification Search
CPC ................ H02M 7/537; H02M 7/493; H02M 2001/0012
(Continued)

(56) References Cited

U.S. PATENT DOCUMENTS 4,302,713 A * 11/1981 Cutler .................. H02M 7/525
                                                318/436
5,400,237 A *  3/1995 Flanagan ............... G05B 11/28
                                                 363/37
(Continued)

FOREIGN PATENT DOCUMENTS

EP      2 595 304       5/2013

OTHER PUBLICATIONS

Received STIC search report from EIC 2800 searcher Benjamin Martin dated Mar. 15, 2017.*

(Continued)

*Primary Examiner* — Timothy J Dole
*Assistant Examiner* — Htet Z Kyaw
(74) *Attorney, Agent, or Firm* — Greenblum & Bernstein, P.L.C.

(57) ABSTRACT

The invention relates to a method for actuating inverter stages (2) switched in parallel, wherein each inverter stage (2) comprises several switching elements (3) with two switching states each. In accordance with the invention, the actuation of the inverter stages (2) occurs via a central control unit (6) which is connected to each inverter stage (2) via a serial data transmission path (5). Measures are proposed for transmitting the selected switching states from the central control unit (6) to the respective inverter stage (2) in order to ensure secure operation of the inverter stages (2) over a plurality of switching processes on the one hand and to reliably prevent functional impairments of the switching elements (3) by erroneous actuation, but to also carry out the (Continued)

actuation of the switching elements (3) of the inverter stages (2) in a sufficiently rapid way on the other hand in order to avoid impairing the quality of the output current formed by the inverter stage (2).

6 Claims, 5 Drawing Sheets

(58) Field of Classification Search
USPC .......................................................... 363/71
See application file for complete search history.

(56) References Cited

U.S. PATENT DOCUMENTS

| | | | | |
|---|---|---|---|---|
| 5,404,089 | A * | 4/1995 | Flanagan | ............... G05B 11/28 |
| | | | | 318/811 |
| 7,049,798 | B2 * | 5/2006 | Chapuis | ................... H02J 1/08 |
| | | | | 323/282 |
| 8,866,348 | B2 * | 10/2014 | Venhaus | ................. H02M 7/49 |
| | | | | 307/151 |
| 9,318,975 | B2 * | 4/2016 | Venhaus | ............... H02M 7/537 |
| 9,385,633 | B2 * | 7/2016 | Kang | .................. H02M 7/5395 |
| 2004/0093533 | A1 | 5/2004 | Chapuis | |
| 2010/0050044 | A1 * | 2/2010 | Kuri | ....................... H03M 13/11 |
| | | | | 714/752 |
| 2011/0181219 | A1 * | 7/2011 | Liegeois | ................. H02M 7/49 |
| | | | | 318/400.29 |
| 2013/0128628 | A1 | 5/2013 | Venhaus | |
| 2013/0291578 | A1 * | 11/2013 | Hatakeyama | ......... F25B 49/025 |
| | | | | 62/230 |
| 2013/0305760 | A1 * | 11/2013 | Shinomoto | ........... F25B 49/025 |
| | | | | 62/238.7 |
| 2015/0036402 | A1 | 2/2015 | Venhaus | |

OTHER PUBLICATIONS

PCT Search Report and Written Opinion issued in PCT/AT2014/050305.

* cited by examiner

METHOD FOR ACTUATING INVERTERS CONNECTED IN PARALLEL

The invention relates to a method for actuating the switching elements of three-phase inverter stages switched in parallel, wherein each of the six switching elements of an inverter stage has two switching states each and the total switching state of an inverter stage is determined by a combination of the switching states of its switching elements which can be represented as a switching state bit sequence of six bits, and by switching the switching elements with a switching frequency a time sequence of total switching states of the inverter stage selected from a number of permitted total switching states is realized for forming a desired output current of the inverter stage, according to the preamble of claim 1.

Such a method was disclosed in EP 2 595 304. US 2004/093533 discloses parallel switching of so-called Point-of-Load (POL) converters with central control and serial transmission paths of the control signals. Three-phase inverter stages are used for forming a desired output current by respective switching of the switching elements and can be found in variable-speed drives for example, in which for forming a desired alternating current an input alternating current is converted at first into direct current and subsequently into the desired alternating current by a suitable switching sequence of the individual inverter switching elements. Inverter stages are especially found in converters, wherein a converter is conventionally provided with a power section having a separate control unit for actuating the switching elements of the converter and thus for setting the desired total switching states depending on the desired output current. The switching elements of an inverter state are thus actuated by a separate local control unit which is structurally arranged on the respective converter. Measurement data on voltages, currents and temperatures are further required for example for controlling the output behaviour and for protecting the inverter stage, which data are detected via sensors and also processed by the local control unit. Delays between the control unit and the actuating stage of the switching elements should be kept as short as possible, so that conventionally the control unit is positioned in direct vicinity to the power section of the inverter. The six actuating signals are transferred in parallel via an insulation separation point to the actuating stage and the required measurement data are detected directly by the control unit. The switching elements especially concern semiconductor switching elements with a control connection ("gate"), preferably IGBTs (insulated-gate bipolar transistors). Typical switching frequencies of such switching elements lie in the kHz range.

High currents need to be converted in the high-power range, which under certain circumstances may not be conducted by the switching elements anymore. The remedy is an analog parallel switching of converters and the inverter stage associated therewith, in order to reduce the current load on the individual inverter stage and thus the individual switching elements. For this purpose it is necessary however that all inverter stages are connected among each other. The need for cabling thus rises strongly with each additional inverter stage. The number of inverter stages switched in parallel is thus highly restricted in practice and limited to a few converters. Furthermore, the transmission paths to a central control unit will become increasingly longer at a rising number of inverters switched in parallel, thus strongly increasing the susceptibility to errors of the overall system together with the limited transmission rates for the measurement data transmitted in parallel.

Optical waveguide connections are therefore also used for actuating inverter stages switched in parallel, which connections show disadvantages however as a result of their temperature sensitivity. Furthermore, the complexity and costs of actuation on the basis of optical waveguides can be compared to that of a conventional analog parallel actuation. The same applies to fieldbus systems, which are further disadvantageous for actuating switching elements of an inverter stage as a result of their limited transmission rates and occasionally high delay times.

It is thus the object of the invention to provide a method and an arrangement with which the actuating and switching effort can be reduced in three-phase inverter stages switched in parallel, wherein secure operation of the inverter stages over a plurality of switching processes must be ensured so that the switching elements are not destroyed by erroneous actuation or are strongly limited with respect to the operational lifespan.

On the other hand, actuation of the switching elements of the inverter stages must occur in a sufficiently rapid way and avoid excessive idle times in order to prevent impairing the quality of the output current formed by the inverter stage. It shall further be possible to realise the solution in accordance with the invention in a comparatively simple and cost-effective manner.

This object is achieved by the features of claim 1. Claim 1 relates to a method for the switching elements of three-phase inverter stages switched in parallel, wherein each of the six switching elements of an inverter stage has two switching states each and the total switching state of an inverter stage is determined by a combination of the switching states of its switching elements which can be represented as a switching state bit sequence of six bits, and by switching the switching elements with a switching frequency a time sequence of total switching states of the inverter stage selected from a number of permitted total switching states is realized for forming a desired output current of the inverter stage. It is provided in accordance with the invention in this case that the actuation of switching elements of an inverter stage occurs via a central control unit connected to the respective inverter stage via a serial data transmission path, wherein the central control unit uniquely assigns a transmission bit sequence consisting of ten bits to each switching state bit sequence which corresponds to a permitted total switching state of the inverter stages, wherein each transmission bit sequence, which is assigned to a permitted total switching state of the inverter stage, differs by at least four bits from another transmission bit sequence which is assigned to another permitted total switching state of the inverter stage, and the central control unit for actuating a selected total switching state transmits the transmission bit sequence assigned to said control unit to the respective inverter stage, and the transmitted transmission bit sequence is received by the inverter stage as at least one receiving bit sequence and assigned to a switching state bit sequence, wherein the transmission bit sequence is transmitted at a transmission rate measured in bits per second, whose ratio to the switching frequency of the switching elements (3) measured in Hertz is at least 1000, and a change in the total switching state of an inverter stage is only carried out when the receiving bit sequence received in the respective inverter stage corresponds to a bit sequence from a predetermined bit sequence group which is formed by transmission bit sequences which are respectively assigned to a permitted total switching state of the inverter stage and by bit sequences which differ from said transmission bit sequences by not more than one bit.

The actuation of the switching elements of all inverter stages thus occurs in accordance with the invention by means of a transmission of transmission bit sequences carried out between serial interfaces of a central control unit and the respective inverter stage, which transmission bit sequences are assigned to a selected total switching state. The total switching state shall be understood as being the switching states of all switching elements of an inverter stage at a specific point in time. A connection between individual inverter stages among each other is no longer necessary because synchronous actuation of the circuits occurs by means of serial interfaces or data transmission paths from the central control unit. The central control unit and/or the inverter stages can comprise known data-system devices which are known as "serializers" or "deserializers" for the conversion of a parallel into a serial data stream and the reversed conversion of a serial data stream into a parallel one.

A structurally simple configuration for power-electronic systems is provided on the basis of the serial, preferably bidirectional, data transmission via electrical data lines. The wiring effort between the inverter stages and the central control unit is considerably reduced by providing serial interfaces. However, further measures in accordance with the invention are required in order to ensure the reliability necessary for the switching of the switching elements of inverter stages and the speed of the actuation and to avoid having to subsequently necessarily arrange the central control unit for the switching elements of all inverter stages constructively and spatially in direct vicinity of the inverter stages.

A transmission bit sequence is uniquely assigned at first in the central control unit to each switching state bit sequence which corresponds to a permitted total switching state of the inverter stages. A permitted total switching state shall be understood as a total switching state of the inverter stage which allows a disturbance-free and destruction-free operation of the inverter stage. A total switching state in which all switching elements of an inverter stage are simultaneously conductive would lead to a bridge short-circuit and would be an example of a prohibited total switching state. A three-phase inverter stage with six switching elements has 27 permitted total switching states for example, from which total switching states for forming a desired output current can be selected. The time-dependent switching of the switching elements realises a time sequence of said selected total switching states of the inverter stage, which determine a time-variable output current of the inverter stage.

Since each of the switching elements of an inverter stage has two respective switching states, which can be designated with "0" and "1", the total switching state of an inverter stage can be determined by a combination of the switching states of its switching elements which can be represented as a switching state bit sequence. A total switching state of a three-phase inverter stage with six switching elements can be represented by a sequence of six "0" or "1", which each reflect the switching state of the individual switching elements. This sequence of "0" or "1", which designates a total switching state of the inverter stage, will be referred to below as a switching state bit sequence.

It would be principally possible to transmit the respective switching state bit sequences for actuating the inverter stage by the central control unit. It could occur in this case as a result of transmission errors however that switching state bit sequences are received which produce a total switching state other than the one that is desired and which in the worst case could cause a prohibited total switching state of the inverter stage. The following measures are therefore proposed in accordance with the invention in order to increase the security of the actuation.

The central control unit therefore does not transmit the switching state bit sequence itself, but a transmission bit sequence uniquely associated therewith which consists of ten bits, wherein each transmission bit sequence assigned to a permitted total switching state of the inverter stage differs by at least four bits from a different transmission bit sequence which is assigned to another permitted total switching state of the inverter stage. The applicant has determined that a transmission protocol can be formulated under these conditions in which a sufficient number of transmission bit sequences can be found on the one hand for the actuation of a three-phase inverter stage and the required transmission security can be ensured on the other hand, as will be explained below in closer detail.

In accordance with the invention, the central control unit subsequently transmits the assigned transmission bit sequence to the respective inverter stage for actuating a selected total switching state, wherein the transmission bit sequence is transmitted at a transmission rate measured in bits per second, whose ratio to the switching frequency of the switching elements measured in Hertz is at least 1000. As a result, only very few transmissions of switching events per unit of time actually occur relative to the theoretically transmittable switching events per unit of time, so that a number of measures can be taken in order to increase the reliability of the actuation of the switching elements, as will be explained below in closer detail. Furthermore, the operating frequencies of the transmission lie above the power-electronic noise spectrums of the inverter stages, so that higher transmission security of the critical actuation signals can also be achieved for this reason.

The transmission bit sequence is subsequently received by the inverter stage as a receiving bit sequence. If the transmission bit sequence was transmitted correctly, it is identical to the receiving bit sequence. It may also occur as a result of transmission errors that a transmission bit sequence arrives with errors in the respective inverter stage so that the receiving bit sequence differs from the transmission bit sequence.

The receiving bit sequence actually received by the inverter stage can differ from the respective transmission bit sequence, depending on the type and the extent of the transmission error, by one bit or even several bits. In the interest of secure actuation of the inverter stage, it would now be possible to exclusively use those receiving bit sequences which correspond to a transmission bit sequence and were thus correctly transmitted. The applicant has recognised however that such a procedure for the switching of switching elements of an inverter stage is unsuitable because the delay times would be too high.

It is therefore proposed in accordance with the invention that a change in the total switching state only occurs when the receiving bit sequence received by the respective inverter stage corresponds to a bit sequence from a predetermined bit sequence group which is formed from transmission bit sequences which are uniquely assigned to a permitted total switching state of the inverter stage and from bit sequences which differ from said transmission bit sequences by not more than one bit. This predetermined bit sequence group thus represents a check that no excessively erroneous receiving bit sequence produces the switching of the switching elements and thus erroneous total switching states of the inverter stage are set. Only such bit sequences which correspond to a bit sequence of the predetermined bit sequence group are "permitted" bit sequences, i.e. bit sequences which are interpreted by the inverter stage as correct or adequately correct, and consequently produce a respective change in the total switching state. Incorrect switching can thus be prevented reliably, which considerably extends the operational lifespan of the switching elements and thus the inverter stage. On the other hand, most transmission errors produce a change in the transmission bit sequence in merely one bit, so that it strongly increases the actuating speed when a major part of said erroneous transmission bit sequences is tolerated and excessive idle times are thus avoided. The additional bit sequences of the predetermined bit sequence group are also referred to below as tolerance bit sequences. As a result of the aforementioned distance of at least four bits, the desired switching state bit sequence can still be identified with sufficient precision. Previous tests of the applicant have provided the result that the velocities required for actuating an inverter stage can be achieved with acceptable precision of the actuation with the transmission protocol provided in accordance with the invention.

A preferred embodiment is characterized in that the transmission rate of the transmission bit sequences is at least 600 MB/s. This range of the transmission rates has proven to be especially advantageous for actuating three-phase inverter stages.

Preferably, the transmission bit sequences have the same number of zeros as ones. They are therefore "DC-current-free" and thus cause no problems in the use of high-pass filters and the like.

A preferred embodiment is further characterized in that the central control unit for actuating a selected total switching state transmits the transmission bit sequence assigned thereto twice successively to the respective inverter stage, and a change in the total switching state is only carried out when two receiving bit sequences which are assigned to the same selected total switching state are received by the respective inverter stage. Such a procedure improves transmission security without substantially increasing the delay times of the actuation. Correct transmission can always be assumed in this case when the two receiving bit sequences are identical and only in this case will there also be a change in the switching state of the inverter stage.

A preferred embodiment is further characterized in that the central control unit transmits at least one start, synchronisation and/or stop bit sequence before and after the transmission of transmission bit sequences, wherein the start, synchronisation and/or stop bit sequence differs from the transmission bit sequences by at least four bits and from a random succession of two successive transmission bit sequences by at least one bit. As a result, a secure signal ("sync") is provided for the start of the end of a transmission or receiving bit sequence, thus increasing the transmission security and ensuring unambiguous interpretation by the inverter stage. Since the transmission rate will be several times higher than the switching frequency, only very few transmissions of switching events actually occur in comparison with the theoretically transmittable switching events. Transmission pauses can be maintained between these transmissions of switching events, so that the start, synchronisation and/or stop bit sequence indicates the beginning or the end of a transmission or receiving bit sequence. No transmission pauses are preferably maintained, but a repeated sequence of the start, synchronisation and/or stop bit sequence is transmitted between the transmission of switching events in order to synchronise the receiving inverter stages. The start, synchronisation and/or stop bit sequence mainly fulfils in this case the function of a synchronisation bit sequence because in this case there is less reference to a start or stop bit sequence.

The serial transmission path is preferably a bidirectional transmission path. This allows on the one hand that a demand can be made by the inverter stage for the renewed transmission of a transmission bit sequence to the central control unit if a receiving bit sequence previously received by the respective inverter stage does not correspond to any bit sequence from the predetermined bit sequence group. On the other hand, measured data and the like can be transmitted from the inverter stage to the central control unit.

Furthermore, an arrangement of several three-phase inverter stages switched in parallel for forming a desired output current by switching a number of six switching elements of each inverter stage is proposed, wherein the switching elements have two switching states each and the total switching state of an inverter stage is determined by a combination of the switching states of its switching elements which can be represented as a switching state bit sequence of six bits. It is proposed in accordance with the invention for such an arrangement that for actuating the switching elements of all inverter stages a central control unit is provided which is connected to each inverter stage via a serial data transmission path, wherein the central control unit comprises a first assignment device which unambiguously assigns the respective switching state bit sequence of a transmission bit sequence for actuating a selected total switching state, and the central control unit is formed to transmit transmission bit sequences to an inverter stage via the serial data transmission path, and the inverter stages are formed to receive receiving bit sequences via the serial data transmission path, and the inverter stages each comprise a second assignment device which assigns switching state bit sequences to the receiving bit sequences, and which are connected via an actuating stage to the switching elements of the respective inverter stage for actuating the respective total switching state.

The first assignment device, which unambiguously assigns a transmission bit sequence to a selected switching state bit sequence in the central control unit, may concern an encoder, or also an assignment device such as provided in the PCS (Physical Coding Sublayer) block of an FPGA (Field Programmable Gate Array) for example.

The second assignment device, which assigns the receiving bit sequences to the switching state bit sequences in the inverter stage, can concern a decoder, or similarly an assignment device as provided for example in the PCS block of an FPGA. The second assignment device seeks an identical bit sequence in the predetermined bit sequence groups after the receipt of a receiving bit sequence and assigns it to the total switching state corresponding to the respective bit sequence group after successful identification. Since the identified total switching state concerns one of the 27 allowed total switching states of the inverter stage, the respective change in the total switching state is initiated. For this purpose, the second assignment device is connected via a rise unit to the switching elements, e.g. to the control connection or gate of a semiconductor switching element.

Preferred embodiments of the invention are described below in closer detail by reference to the enclosed drawings, wherein.

Figure 1:
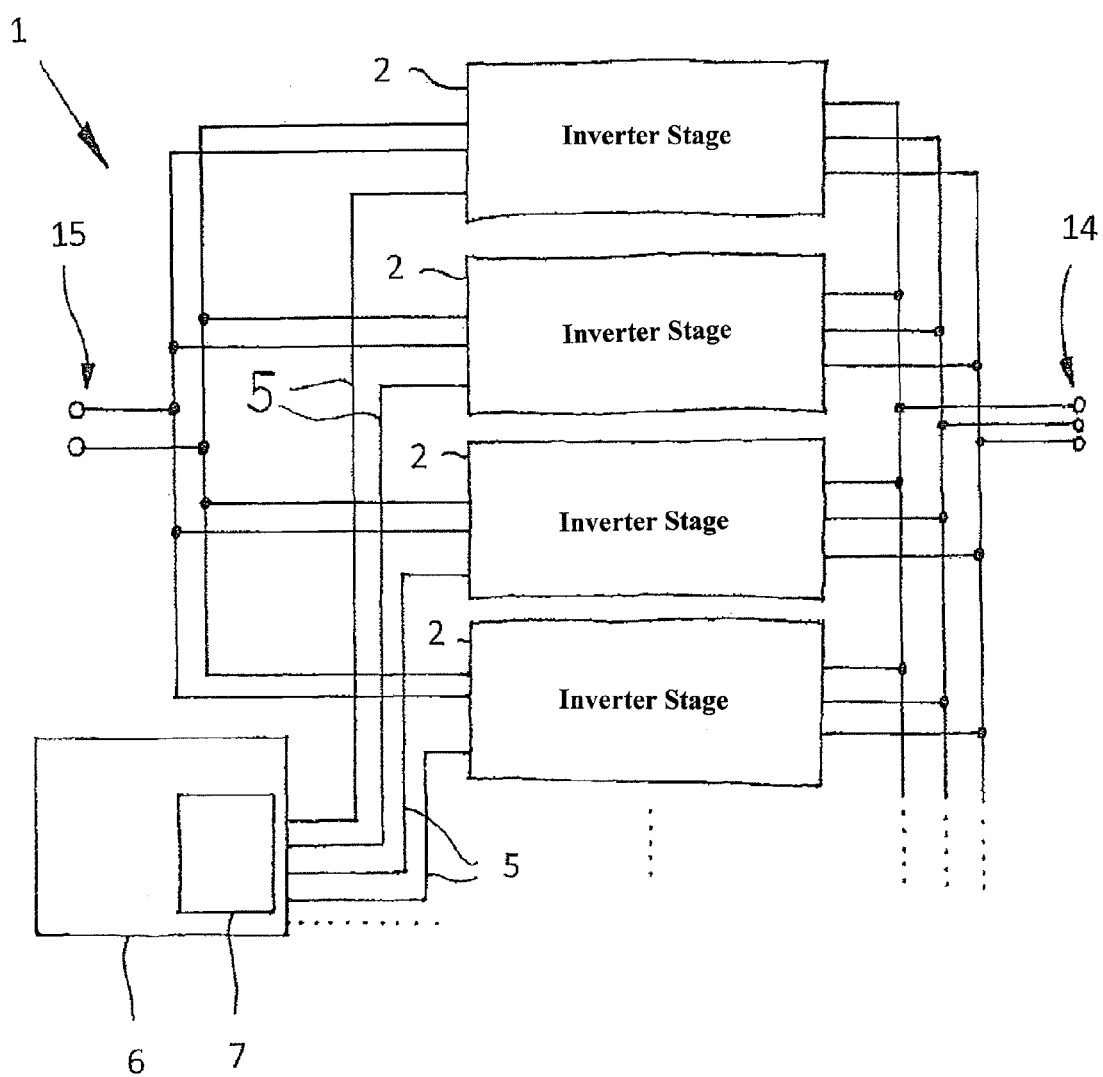
FIG. 1 shows a schematic view of an arrangement in accordance with the invention consisting of several inverter stages switched in parallel.

FIG. 1 shows an arrangement 1 consisting of several inverter stages 2 which are switched in parallel and which comprise a common, three-phase output 14. The arrangement 1 provides a desired output current at said output 14. The illustrated embodiment also shows a common input 15 of the inverter stages 2, which input is supplied with an input voltage in operation.

Figure 2:
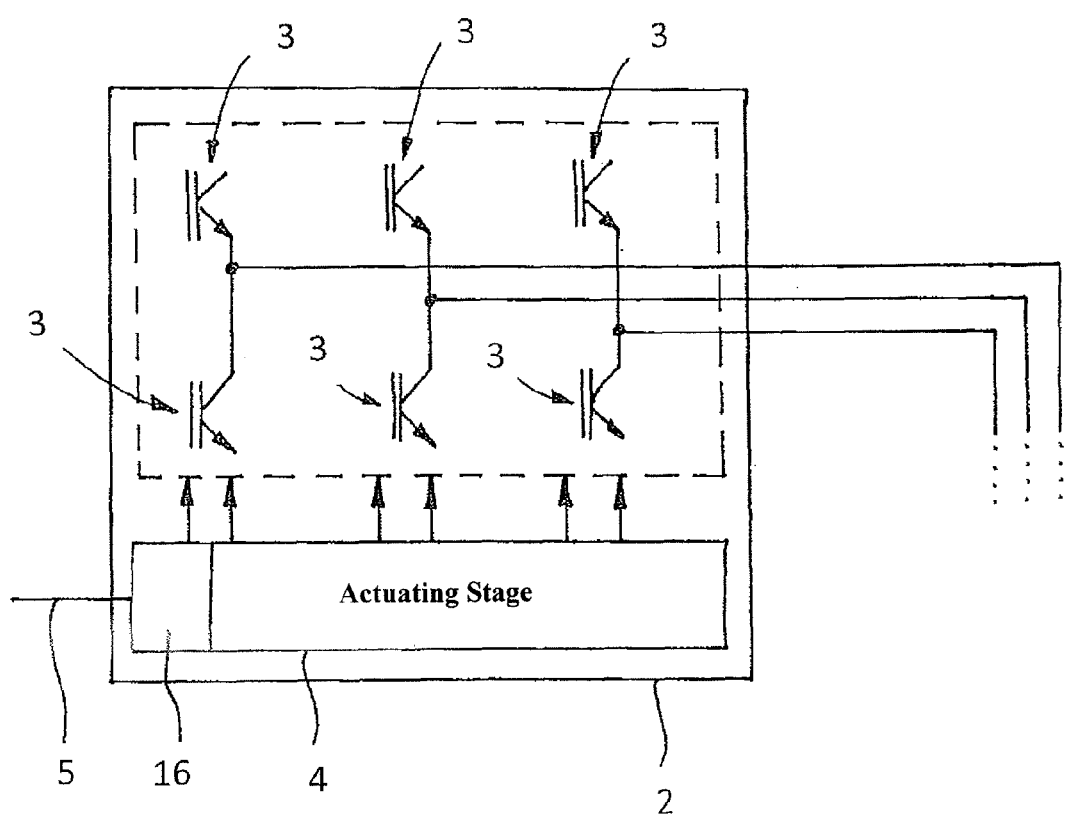
FIG. 2 shows a schematic view of an inverter stage.
Figure 3:
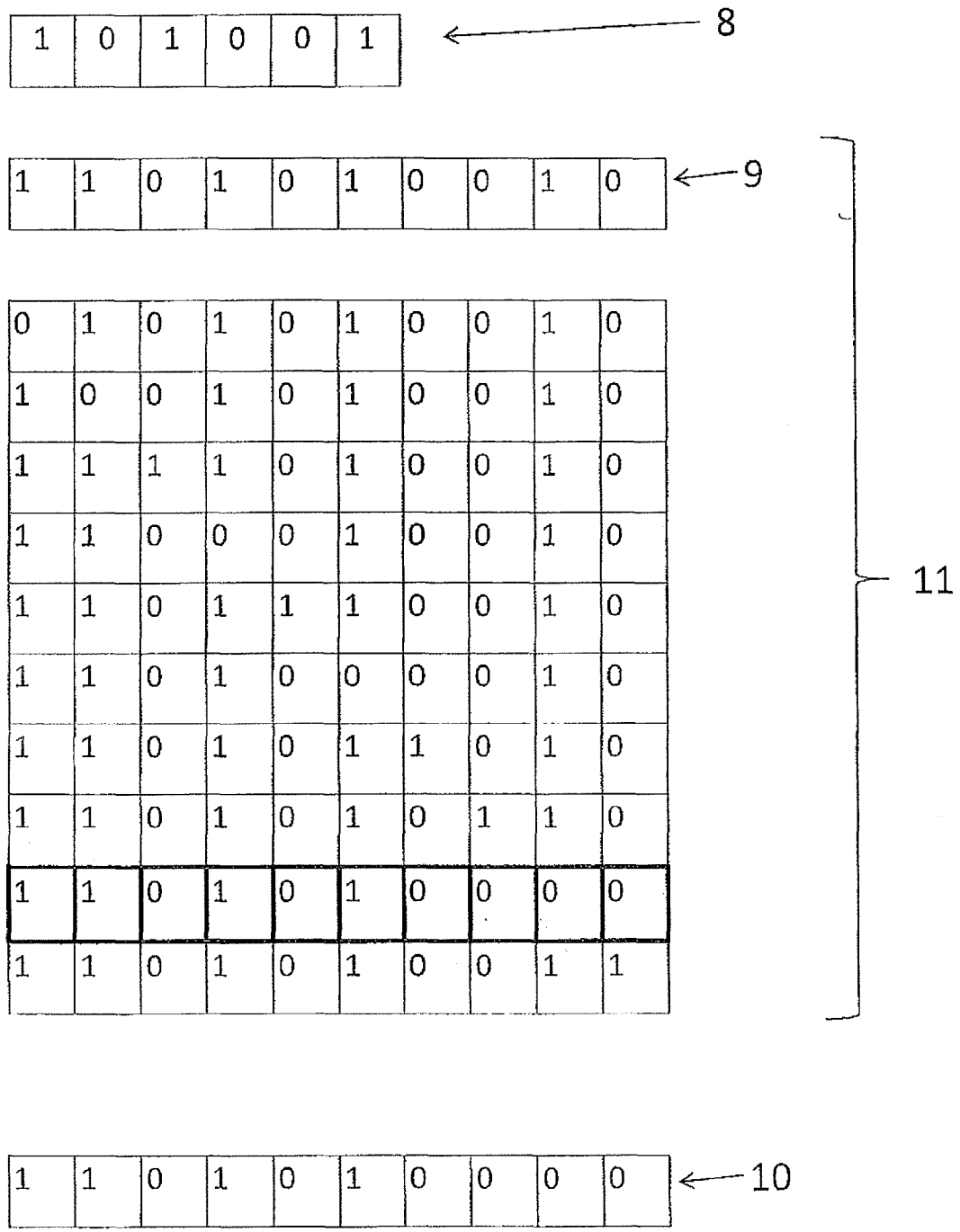
FIG. 3 shows an example of a switching state bit sequence and a transmission bit sequence assigned thereto with the bit sequence group determined for said sequence.
Figure 4:
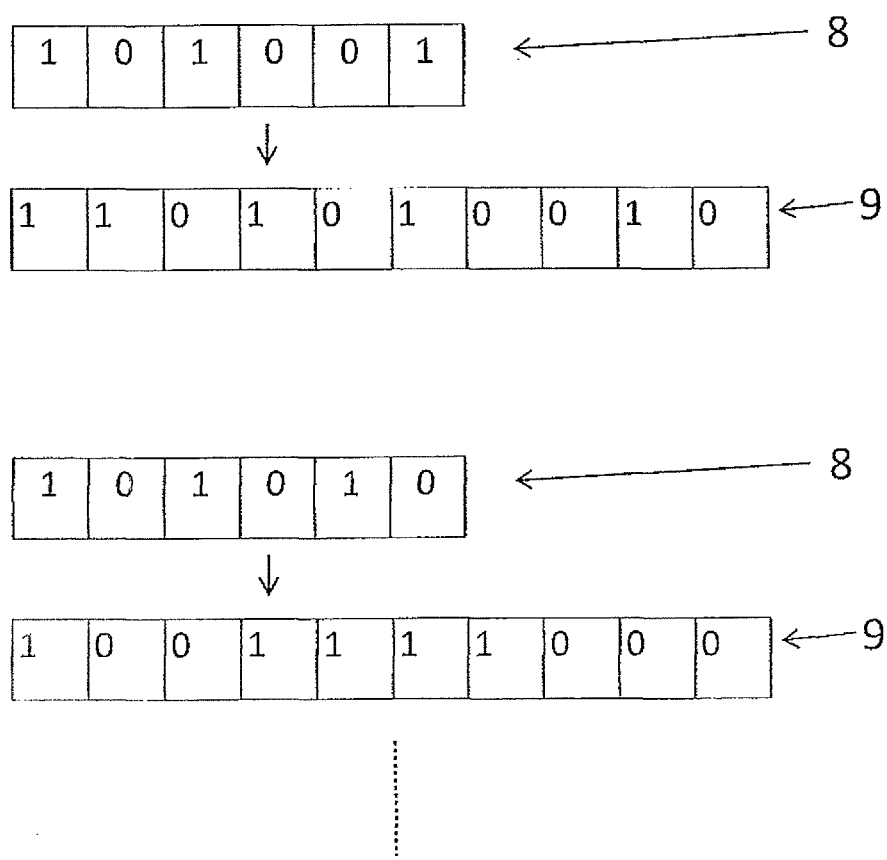
FIG. 4 shows examples for switching state bit sequences and transmission bit sequences assigned thereto, which differ by at least four bits.

Each inverter stage 2 comprises six switching elements 3 (FIG. 2) with two switching states each, thus providing a theoretical number of total switching states of an inverter stage 2 by all possibilities for combination. In the case of six switching elements 3 (as shown in the embodiment according to FIG. 2) there are 64 theoretically possible total switching states. They are reduced to 27 permitted total states because there are also prohibited switching states which would cause a short circuit. The total switching states of an inverter stage 2 can respectively be represented by a switching state bit sequence 8 consisting of six bits (FIGS. 3 and 4). A switching state bit sequence 8, which corresponds to a permitted total switching state would be 101001 for example, which corresponds to a total switching state of the inverter stage 2 in which, with reference to FIG. 2, the switching element 3 at the top left is closed (1), the switching element 3 at the bottom left is open (0), the switching elements 3 at the top centre is closed (1), the switching element 3 at the bottom centre is open (0), the switching elements 3 at the top right is open (0), and the switching element at the bottom right is closed (1).

The arrangement 1 comprises a central control unit 6 for actuating the switching elements 3 of all inverter stages 2, which central control unit is connected to each inverter stage 2 via a digital, serial data transmission path 5 for the exchange of electrical signals. The data transmission path 5 preferably concerns a bidirectional data transmission path 5, which in the practical embodiment is formed by a pair of differential cables for the differential or pseudo-differential signal transmission, wherein a pair of differential cables is preferably provided for each direction of transmission.

A transmission bit sequence 9 is unambiguously assigned in the central control unit 6 to each permitted total switching state (FIG. 4). If a desired total switching state of an inverter stage 2 is to be initiated, a transmission bit sequence 9 is unambiguously assigned to the respective switching state bit sequence 8 in a first assignment device 7 of the central control unit 6. This assignment can occur via an encoder for example, or simpler components are used and configured in a respective manner, as are provided for example in the PCS block of an FPGA. As is shown in FIG. 3, the switching state bit sequences 8 comprise a total of six bits in the case of six switching elements 3, but the transmission bit sequences 9 each comprise 10 bits in accordance with the invention however. The assignment between the switching state bit sequences 8 (or the permitted total switching states) and the transmission bit sequences 9 is carried out in such a way that each transmission bit sequence 9 which corresponds to a total switching state differs in accordance with the invention by four bits from any other transmission bit sequence 9 which corresponds to another total switching state. In order to minimise a DC component to the highest possible extent, the transmission bit sequences 9 further preferably have a number of zeros which is equal to the number of ones (FIG. 4).

The central control unit 6 is further formed to transmit transmission bit sequences 9 to the respective inverter stages 2 via the serial data transmission paths 5. The transmission bit sequences 9 are received as receiving bit sequences 10 by the respective inverter stages 2 and decoded there (FIG. 3). The receiving bit sequences 10 can differ from the original transmission bit sequences 9 as a result of transmission errors, as can be seen for example in the receiving bit sequence 10 according to FIG. 3 at the one but last position of the bit sequence. It therefore needs to be determined how to deal with such transmission errors.

In the interest of secure actuation of the inverter stage, it would be possible for example to only accept such receiving bit sequences 10 which correspond to one of the 27 possible transmission bit sequences 9 and will thus obviously be correctly transmitted. The transmission bit sequence 10 of FIG. 3 would thus not be accepted because it neither corresponds to the transmission bit sequence 9 shown in FIG. 3, nor to any other transmission bit sequence 9 because the transmission bit sequences 9 in accordance with the invention differ by at least four bits. Since in this case no change is made to the total switching state of the inverter stage 2 in accordance with the invention, the transmission must be repeated in order to still realise the selected total switching state of the inverter stage 2. The applicant has recognised however that such a procedure is no longer suitable for the practical demands in the switching of switching elements 3 of an inverter stage 2 because the delay times become too high and serial actuation of the switching elements 3 is no longer achieved in an acceptable manner.

It is therefore provided in accordance with the invention that a change in the total switching state also occurs when the receiving bit sequence 10 received in the respective inverter stage 2 corresponds to a bit sequence from a predetermined bit sequence group 11, which is formed from transmission bit sequences 9 which are respectively unambiguously assigned to a permitted total switching state of the inverter stage 2 and from bit sequences which differ from said transmission bit sequences 9 by not more than one bit. It can be seen in the example of FIG. 3 for example that although the receiving bit sequence 10 does not correspond to the illustrated transmission bit sequence 9, it still corresponds to a bit sequence of a predetermined bit sequence group 11, which is shown in FIG. 3 with the distinct bold bordering. This receiving bit sequence 10 is thus accepted in accordance with the invention and assigned to the transmission bit sequence 9 shown in FIG. 3. This assignment is carried out by a second assignment device 16 arranged on the respective inverter stage 2. A change in the total switching state of the inverter stage 2 is then triggered by the actuating device 4.

The bit sequence group 11 defined and predetermined for each transmission bit sequence 9 represents a check on the one hand that erroneous receiving bit sequences 10 do not produce any switching of the switching elements 3, but also define on the other hand a tolerable amount of transmission errors, which thus increases the switching speed of the switching elements 3. The comparison between the receiving bit sequences 10 and the bit sequence groups 11 is made in the inverter stage 2 by the second assignment device 16, which is provided upstream of the actuation stage 4 for the switching elements 3 (see FIG. 2).

The transmission bit sequence 9 is transmitted at a transmission rate which is measured in bits per second, which is several times higher than the switching frequency of the switching elements 3 of the inverter stages 2, preferably with at least 600 MB/s. Furthermore, it is advantageous if data transmission only occurs when a change in the total switching state of the inverter stage 2 is actually desired in order to reduce the possibility of disturbances to a very short time window. By taking the measure in accordance with the invention into account that the transmission rate is several times higher than the switching frequency, only very few transmissions of switching events thus occur relative to the switching events that could be transmitted theoretically. The switching time is less critical than the selected switching state because loads with inductive properties are mostly arranged anyway at the output of the inverter stages 2.

Figure 5:
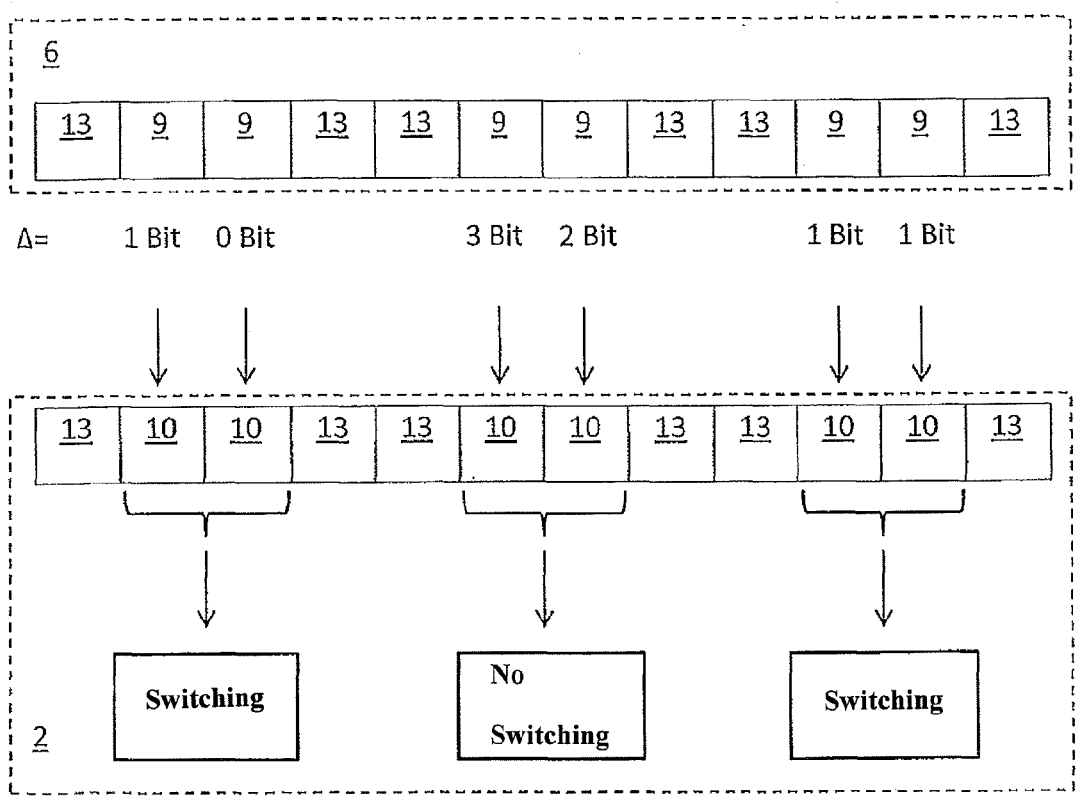
FIG. 5 shows a comparison of a "stream" of transmission bit sequences with a "stream" of receiving bit sequences.

Further measures are taken concerning data transmission for increasing the reliability of the actuation, as explained by reference to FIG. 5. In FIG. 5, a stream of transmission bit sequences 9 generated by the central control unit 6 is set against a stream of receiving bit sequences 10 received by an inverter stage 2. In FIG. 5, the transmission bit sequences 9 are respectively provided with the same reference number, but it is understood that the transmission bit sequences 9 can be encoded the different total switching states of an inverter stage 2. Start, synchronisation and/or stop bit sequences 13 are provided in the data stream of the transmission bit sequences 9, which bit sequences 13 signal the start of a transmission of transmission bit sequences 9 to the inverter stage 2, the end of a transmission of transmission bit sequences 9, and the start and end of a single transmission bit sequence 9. The start, synchronisation and/or stop bit sequence 13 differs from the transmission bit sequences 9 by at least four bits, and preferably by at least one bit from a random succession of two successive mission bit sequences 9. If no transmission bit sequences 9 are transmitted, a stream of start, synchronisation and/or stop bit sequences 13 can be transmitted in order to enable a permanent synchronisation of the inverter stages 2.

It could also occur that the start, synchronisation and/or stop bit sequence 13 is converted by transmission errors into an undesirable transmission bit sequence 9, so that an undesirable switching command is placed on the inverter stage 2. As is shown in FIG. 5, the respective transmission bit sequence 9 is transmitted twice successively for a change in the total switching state of an inverter stage 2. The two identical receiving transmission bit sequences 9 are received by the respective inverter stage 2 as two receiving bit sequences 10, which can now be identical or differ from each other as a result of transmission errors. A change in the total switching state preferably only occurs when the two receiving bit sequences 10 are identical or respectively correspond to a bit sequence of the same bit sequence group 11.

The difference A shown in FIG. 5 indicates the number of bits by which a receiving bit sequence 10 differs from the original transmission bit sequence 9. The transmission of the first receiving bit sequence 10 shown on the left side in FIG. 5 leads to a change in the total switching state of the inverter stage 2 because a difference of one bit is tolerated (see FIG. 3). The transmission of the subsequent receiving bit sequence 10 which is shown in the middle in FIG. 5 does not lead to any change in the total switching state of the inverter stage 2 because differences of three or two bits are no longer tolerated by the second assignment device 16. In this case, a demand ("error flag") is made by the inverter stage 2 for a renewed transmission of a transmission bit sequence 9 to the central control unit 6. It needs to be considered that the transmission rate is higher by several times in accordance with the invention than the switching frequency of the switching elements 3, so that sufficient time remains for the transmission of the demand ("error flag") and the renewed transmission of a transmission bit sequence 9 until the transmission of the next transmission bit sequence 9. The transmission of the last receiving bit sequence 10 which is shown in FIG. 5 on the right-hand side leads to a change in the total switching state of the inverter stage 2 because differences of one respective bit are tolerated.

The invention thus provides a method and an arrangement with which the actuation and switching effort can be reduced in three-phase inverter stages 2 which are switched in parallel, wherein secure operation of the inverter stages 2 is ensured over a plurality of switching processes and functional impairments of the switching elements 3 by erroneous actuation are reliably prevented. Furthermore, actuation of the switching elements 3 of the inverter stages 2 occurs in a sufficiently rapid way in order to avoid impairing the quality of the output current formed by the inverter stage 2. The solution in accordance with the invention is comparatively simple with respect to the required hardware and can be realised at low cost.

The invention claimed is:

1. A method for actuating the switching elements of three-phase inverter stages switched in parallel, wherein each of the six switching elements of an inverter stage has two switching states (0, 1) each, and the total switching state of an inverter stage determined by a combination of the switching states (0, 1) of its switching elements, which combination can be represented as a switching state bit sequence of six bits, and by switching the switching elements with a switching frequency a time sequence of total switching states of the inverter stage selected from a number of permitted total switching states is realized for forming a desired output current of the inverter stage, wherein the actuation of the switching elements of an inverter stage occurs via a central control unit connected to the respective inverter stage via a serial data transmission path, wherein the central control unit unambiguously assigns a transmission bit sequence consisting of ten bits to each switching state bit sequence which corresponds to a permitted total switching state of the inverter stages, wherein each transmission bit sequence, which is assigned to a permitted total switching state of the inverter stage, differs by at least four bits from another transmission bit sequence which is assigned to another permitted total switching state of the inverter stage, and the central control unit for actuating a selected total switching state transmits the transmission bit sequence assigned to said control unit to the respective inverter stage, and the transmitted transmission bit sequence is received by the inverter stage as at least one receiving bit sequence and assigned to a switching state bit sequence, wherein the transmission bit sequence is transmitted at a transmission rate measured in bits per second, whose ratio to the switching frequency of the switching elements measured in Hertz is at least 1000, and a change in the total switching state of an inverter stage is only carried out when the receiving bit sequence received in the respective inverter stage corresponds to a bit sequence from a predetermined bit sequence group which is formed by transmission bit sequences which are respectively unambiguously assigned to a permitted total switching state of the inverter stage and by bit sequences which differ from said transmission bit sequences by not more than one bit.

2. The method according to claim 1, wherein the transmission rate of the transmission bit sequences is at least 600 MB/s.

3. The method according to claim 1, wherein the transmission bit sequences have the same number of zeros as ones.

4. The method according to claim 1, wherein the central control unit for actuating a selected total switching state transmits the transmission bit sequence assigned thereto twice successively to the respective inverter stage, and a change in the total switching state is only carried out when two receiving bit sequences which are assigned to the same selected total switching state are received by the respective inverter stage.

5. The method according to claim 1, wherein the central control unit transmits at least one start, synchronisation and/or stop bit sequence before and after the transmission of transmission bit sequences, wherein the start, synchronisation and/or stop bit sequence differs from a random succession of two successive transmission bit sequences by at least one bit.

6. The method according to claim 1, wherein a demand for the renewed transmission of a transmission bit sequence to the central control unit can be made by the inverter stage in a serial transmission path formed as a bidirectional transmission path if a receiving bit sequence previously received by the respective inverter stage does not correspond to any bit sequence from the predetermined bit sequence group.

* * * * *